(12) United States Patent
Wu et al.

(10) Patent No.: US 11,490,173 B2
(45) Date of Patent: Nov. 1, 2022

(54) SWITCH OF AUDIO AND VIDEO (71) Applicant: Shanghai Bilibili Technology Co., Ltd., Shanghai (CN)

(72) Inventors: Zhiqiang Wu, Shanghai (CN); Hanchao Zheng, Shanghai (CN); Hui Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/330,226

(22) Filed: May 25, 2021

(65) Prior Publication Data

US 2021/0281929 A1 Sep. 9, 2021

Related U.S. Application Data (63) Continuation of application No. PCT/CN2019/128458, filed on Dec. 25, 2019.

(30) Foreign Application Priority Data

Jan. 30, 2019 (CN) .......................... 201910092875.1

(51) Int. Cl.
*G06F 15/16* (2006.01)
*H04N 21/8547* (2011.01)
(Continued)

(52) U.S. Cl.
CPC ..... *H04N 21/8547* (2013.01); *H04N 21/2662* (2013.01); *H04N 21/8106* (2013.01); *H04N 21/8456* (2013.01)

(58) Field of Classification Search
CPC ........... H04N 21/8547; H04N 21/2662; H04N 21/8106; H04N 21/8456
(Continued)

(56) References Cited

U.S. PATENT DOCUMENTS

2014/0130073 A1* 5/2014 Yu ..................... H04N 21/2668
725/14
2015/0100702 A1 4/2015 Krishna et al.
(Continued)

FOREIGN PATENT DOCUMENTS

CN 101873447 A 10/2010
CN 102625150 A 8/2012
(Continued)

OTHER PUBLICATIONS

International Patent Application No. PCT/CN2019/128458, English Translation of International Search Report, dated Feb. 26, 2020, 3 pages.
(Continued)

*Primary Examiner* — Alan S Chou
(74) *Attorney, Agent, or Firm* — Kilpatrick Townsend & Stockton LLP (57) ABSTRACT

A method includes: sending, upon receipt of an audio-only playing instruction in a process of synchronously playing audio and video of streaming media content using DASH, a request of obtaining audio data files of the streaming media content to a server, wherein video data files formed according to video content of the streaming media content and the audio data files formed according to audio content of the streaming media content are stored in the server; receiving the audio data files of the streaming media content from the server, and parsing out the audio content according to the audio data files; performing audio-only playing for the streaming media content according to the audio content.

20 Claims, 4 Drawing Sheets

(51) Int. Cl.
*H04N 21/2662* (2011.01)
*H04N 21/81* (2011.01)
*H04N 21/845* (2011.01)

(58) Field of Classification Search
USPC ........................................................ 709/231
See application file for complete search history.

(56) References Cited

U.S. PATENT DOCUMENTS

| | | | |
|---|---|---|---|
| 2015/0213839 A1 | 7/2015 | Woodman et al. | |
| 2016/0360014 A1* | 12/2016 | Kwak | ................ H04N 21/6112 |
| 2017/0063960 A1* | 3/2017 | Stockhammer | .. H04N 21/44209 |
| 2017/0156015 A1* | 6/2017 | Stockhammer | .... H04N 21/8456 |
| 2019/0020915 A1* | 1/2019 | Stockhammer | ..... H04L 67/2804 |
| 2019/0028746 A1 | 1/2019 | Inzerillo | |
| 2020/0236423 A1* | 7/2020 | Yoo | ................. H04N 21/26258 |
| 2020/0287828 A1* | 9/2020 | Kwak | ................. H04N 21/643 |
| 2020/0321015 A1* | 10/2020 | Katsumata | ............. G10K 15/02 |
| 2021/0281893 A1* | 9/2021 | Badawiyeh | ........ H04N 21/6332 |

FOREIGN PATENT DOCUMENTS

| | | |
|---|---|---|
| CN | 103024490 A | 4/2013 |
| CN | 104581320 A | 4/2015 |
| CN | 105612753 A | 5/2016 |
| CN | 105940671 A | 9/2016 |
| CN | 105979060 A | 9/2016 |
| CN | 106792075 A | 5/2017 |
| WO | 2016149928 A1 | 9/2016 |

OTHER PUBLICATIONS $2^{nd}$ Office Action cited in counterpart application, Chinese Patent Appl. No. 201910092875.1, dated Nov. 2, 2021, 4 pages.
Extended European Search Report for EP Application No. 19912378.7, dated May 31, 2022, 4 pages.

* cited by examiner

SWITCH OF AUDIO AND VIDEO

CROSS-REFERENCE TO RELATED APPLICATION

The present application is a continuation under 35 U.S.C. 111(a) of PCT International Application No. PCT/CN2019/128458, filed on Dec. 25, 2019, which claims priority to Chinese patent application No. 201910092875.1, filed on Jan. 30, 2019, the entire contents of which are hereby incorporated by reference in its entirety for all purposes.

TECHNICAL FIELD

The present application relates to audio and video playing, and more particularly to a switch of audio and video.

BACKGROUND

With the continuous development of the internet and smart terminals, more and more users choose to use smart terminals (e.g., mobile phones, computers) to play audio, video, and other streaming media; users can obtain video content and audio content from network servers through smart terminals and play them on the smart terminals.

SUMMARY

One aspect of the present application provides a method, including:

sending, upon receipt of an audio-only playing instruction in a process of synchronously playing audio and video of streaming media content using Dynamic Adaptive Streaming over HTTP (DASH), a request of obtaining audio data files of the streaming media content to a server, wherein video data files formed according to video content of the streaming media content and the audio data files formed according to audio content of the streaming media content are stored in the server;

receiving the audio data files of the streaming media content from the server, and parsing out the audio content according to the audio data files;

performing audio-only playing for the streaming media content according to the audio content.

Another aspect of the present application also provides a computing device, comprising:

one or more processors; and a memory storing one or more programs configured to be executed by the one or more processors, the one or more programs comprising instructions for: sending, upon receipt of an audio-only playing instruction in a process of synchronously playing audio and video of streaming media content using Dynamic Adaptive Streaming over HTTP (DASH), a request of obtaining audio data files of the streaming media content to a server, wherein video data files formed according to video content of the streaming media content and the audio data files formed according to audio content of the streaming media content are stored in the server;

receiving the audio data files of the streaming media content from the server, and parsing out the audio content according to the audio data files;

performing audio-only playing for the streaming media content according to the audio content.

Another aspect of the present application also provides a non-transitory computer-readable storage medium storing one or more programs comprising instructions that, when executed by one or more processors of a computing device, cause the computing device to perform operations comprising:

sending, upon receipt of an audio-only playing instruction in a process of synchronously playing audio and video of streaming media content using Dynamic Adaptive Streaming over HTTP (DASH), a request of obtaining audio data files of the streaming media content to a server, wherein video data files formed according to video content of the streaming media content and the audio data files formed according to audio content of the streaming media content are stored in the server;

receiving the audio data files of the streaming media content from the server, and parsing out the audio content according to the audio data files;

performing audio-only playing for the streaming media content according to the audio content.

BRIEF DESCRIPTION OF THE DRAWINGS

Various other advantages and benefits will become apparent to those of ordinary skill in the art upon reading the detailed description of some embodiments below. The drawings are only for the purpose of illustrating some embodiments and are not to be considered as limiting the present application. Moreover, the same reference numerals are used throughout the drawings to refer to the same parts. In the drawings.

DETAILED DESCRIPTION OF EMBODIMENTS

To make the embodiments and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

In related art, an audio-video play mode cannot be switched to an audio-only play mode. For example, when users play audio and video like music or cross-talk, it is not able to only play audio content without playing video content.

The inventors realized that a reason for not being able to perform audio-only playing is: video content and audio content are stored in one streaming media file, and users can only obtain the streaming media file, not the audio content only. How to play audio only has become a technical problem that needs to be solved urgently.

According to some embodiments, a method of switching audio and video provided in the present application will be described with reference to drawings as follows.

Figure 1:
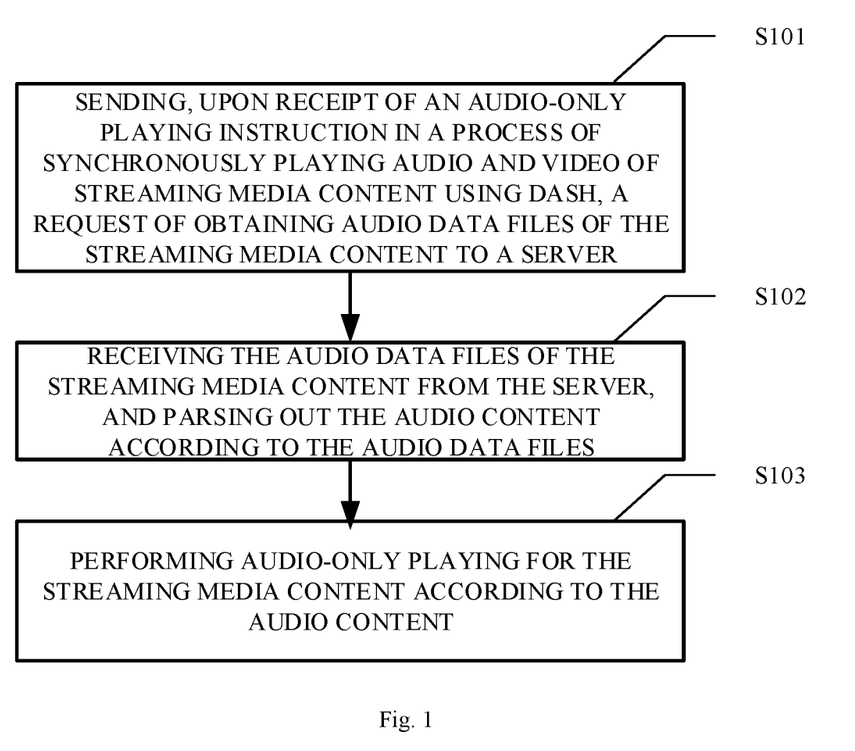
FIG. 1 is a flowchart of a method of switching audio and video according to some embodiments.

FIG. 1 illustrates a flowchart of a method of switching audio and video of the present application, and the method is applied to a client, as shown in FIG. 1, the method includes the steps of:

Step S101, sending, upon receipt of an audio-only playing instruction in a process of synchronously playing audio and video of streaming media content using DASH, a request of obtaining audio data files of the streaming media content to a server.

DASH (Dynamic Adaptive Streaming over HTTP) is an adaptive bit-rate streaming technology that enables high-quality streaming media to be delivered over the internet through traditional HTTP web servers. In related audio and video playing technology, audio content and video content are contained in one streaming media file, and the client obtains the streaming media file from the server and performs audio and video playing through parsing the streaming media file. However, in DASH technology, the server compresses and encapsulates the video content of the streaming media content to form video data files, and compresses and encapsulates the audio content of the streaming media content to form the audio data files. The client needs to obtain the video data files and the audio data files separately from the server, and perform audio and video playing through parsing the video data files and the audio data.

In some embodiments, the video data files formed according to the video content of content to be played and the audio data file formed according to the audio content of the content to be played are stored in the server. In some embodiments, using a characteristic of separating audio content from video content in DASH, only a request of obtaining the audio data files to the server but not a request of obtaining the video data files to the server is sent when the audio-only playing is required.

According to some embodiments, there are three ways to trigger the audio-only playing instruction as follows.

Firstly, the audio-only playing instruction is triggered by a user by clicking a preset button.

Secondly, the audio-only playing instruction is triggered when a play interface is minimized.

Thirdly, the audio-only playing instruction is triggered when a play software is switched to run in the background.

It should be noted that the first case is applicable to both WEB terminals (e.g., a PC) and mobile terminals (e.g., a smartphone), that is, upon receipt of the audio-only playing instruction triggered by the user, the play mode is automatically switched to an audio-only play mode, and only the audio content is played but the video content is not played. The second case is applicable to the WEB side, that is, when the play interface playing streaming media content is minimized by the user, the play mode is automatically switched to the audio-only play mode. The third case is applicable to the mobile terminals, that is, when the application software used to play media content is switched to run in the background by the user, the play mode is automatically switched to the audio-only play mode.

In some embodiments, regarding playing streaming media content through the application software on the mobile terminals, whether the play mode is to be switched to the audio-only play mode is determined according to whether the audio-only playing instruction triggered by the user is received or whether the play software is switched to run from foreground to background. In some embodiments, regarding playing the streaming media content through a webpage on the WEB side, whether the play mode is to be switched to the audio-only play mode is determined according to whether the audio-only playing instruction triggered by the user is received or whether the play interface is minimized by the user. According to some embodiments, several determination methods for switching to the audio-only play mode are provided, which can simplify user operations and improve user experience.

In addition, in DASH technology, the streaming media content is divided into multiple segments, with each segment corresponding to a certain time length of play content (e.g., 10 seconds) and each segment corresponding to an audio data file and a video data file. Before playing a segment, the client obtains the audio data file and video data file of the segment from the server, parses the audio data file to obtain audio content and caches the audio content in the audio buffer area, and parses the video data file to obtain the video content and caches the video content in the video buffer area.

Based on segmentation characteristics of DASH, the step S101 includes:

Step A1, upon receipt of an audio-only playing instruction, stopping obtaining the video content from the video buffer area, obtaining the audio content only from the audio buffer area, and performing the audio-only playing for a current segment according to the audio content.

In some embodiments, during a process of playing a segment of the streaming media content, when it is determined that it is necessary to switch to audio-only playing, a link of a video stream is stopped, and only a link of an audio stream is retained, then only the audio content is continued to play.

Step A2, sending a request of obtaining an audio data file of a next segment to the server.

Starting from the next segment, the client only sends a request of obtaining the audio data files of the streaming media content to the server, and no longer sends a request of obtaining the video data files of the streaming media content.

In some embodiments, when it is necessary to switch to the audio-only play mode, audio-only playing is performed on a current segment, then starting from the next segment, only the audio data files are obtained from the server, until switching to play audio and video synchronously.

Step 102: receiving the audio data files of the streaming media content from the server, and parsing out the audio content according to the audio data files.

According to some embodiments, the parsing out audio content according to the audio data files includes:

decapsulating the audio data files to obtain audio stream compression encoded data, and decoding the audio stream compression encoded data to obtain audio content.

Decapsulation, also known as demultiplexing, is to separate data of an input packaging format (e.g., AVI format, PM4 format, FLV format) into audio stream compression encoded data and video stream compression encoded data. In addition, some basic information of the streaming media file can be obtained in a process of the decapsulation.

Decoding is a process of restoring compressed data to audio and video signals by a decoder.

Step 103: performing audio-only playing for the streaming media content according to the audio content.

According to some embodiments, the step 103 includes:

sending the decoded audio content to a corresponding sound card in the client for playing.

Figure 2:
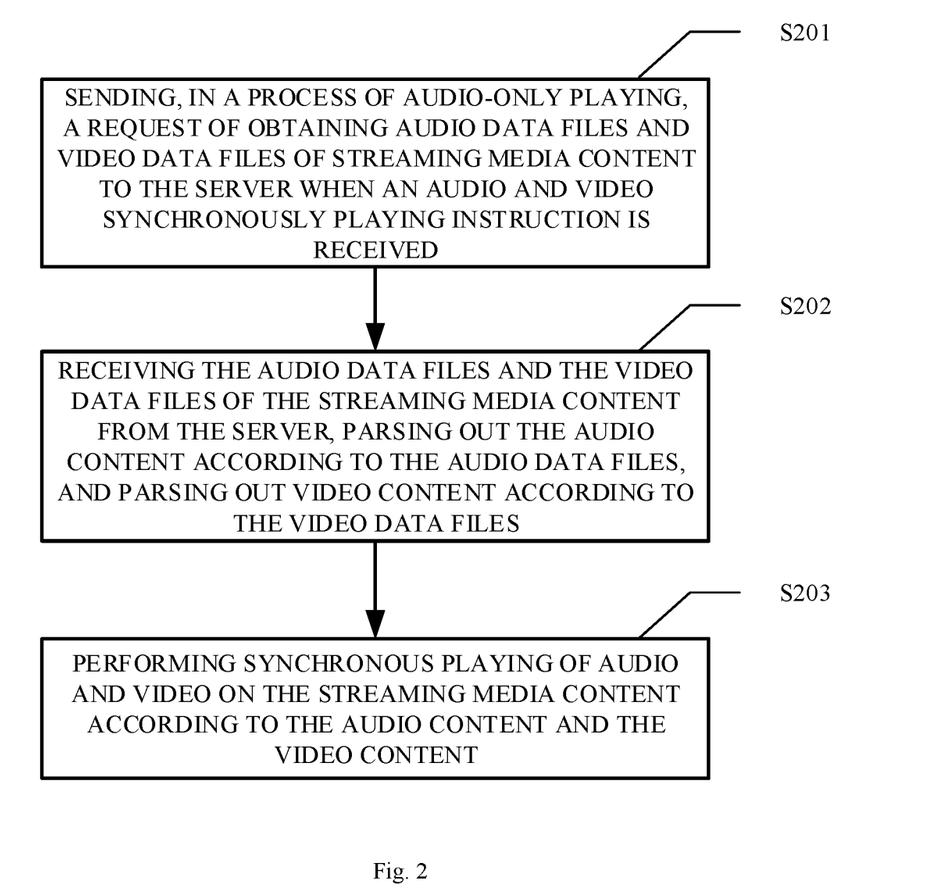
FIG. 2 is a flowchart of a method of switching audio-only playing to audio-video synchronously playing according to some embodiments.

In addition, as shown in FIG. 2, the embodiment also provides a method of switching audio-only playing to audio and video synchronously playing, and the method includes the steps of:

Step 201, sending, upon receipt of an audio and video synchronous playing instruction in a process of audio-only playing, a request of obtaining audio data files and video data files of streaming media content to the server.

According to some embodiments, there are three ways to trigger the audio and video synchronously playing instruction as follows.

Firstly, the audio and video synchronously playing instruction is triggered by a user by clicking a preset button.

Secondly, the audio and video synchronously playing instruction is triggered in response to a detection that a minimization of the play interface is canceled.

Thirdly, the audio and video synchronously playing instruction is triggered in response to a detection that the play software is switched from running in the background to running in the foreground.

It should be noted that the first case is applicable to both WEB terminals (e.g., a PC) and mobile terminals (e.g., a smartphone), that is, upon receipt of the audio-only playing instruction triggered by the user, the play mode is automatically switched to the audio and video synchronously play mode, and the audio content and the video content are played synchronously. The second case is applicable to the WEB side, that is, when the minimization of the play interface is canceled by the user, the play mode is automatically switched to the audio and video synchronously play mode. The third case is applicable to the mobile terminals, that is, when the application software used to play media content is switched from running in the background to running in the foreground by the user, the play mode is automatically switched to the audio and video synchronously play mode.

In some embodiments, regarding playing streaming media content through the application software on the mobile terminals, whether the play mode is to be switched to the audio and video synchronously play mode is determined according to whether an audio and video switching instruction triggered by the user is received or whether the play software is switched from running in the background to running in the foreground. In some embodiments, regarding playing the streaming media content through a webpage on the WEB side, whether the play mode is to be switched to the audio and video synchronously play mode is determined according to whether the audio and video switching instruction triggered by the user is received or whether the play interface is reverted from minimization.

According to some embodiments, sending a request of obtaining audio data files and video data files of streaming media content to the server includes:

obtaining a timestamp of audio content currently being played, and determining a segment index of audio content currently being played according to the timestamp;

sending a request of obtaining an audio data file and a video data file corresponding to the segment index to the server, wherein the streaming media content is divided into multiple segments, each segment corresponds to a segment index, and each segment index corresponds to an audio data file and a video data file.

In some embodiments, during performing the audio-only playing for the streaming media content, when recovery from the audio-only playing to audio and video synchronously playing is required, the audio content and the video content of the current segment are obtained again from the server to perform the audio and video synchronously playing for the current segment according to audio content currently being played.

Step 202, receiving the audio data files and the video data files of the streaming media content from the server, parsing out the audio content according to the audio data files, and parsing out video content according to the video data files.

According to some embodiments, the step 202 includes:

decapsulating the audio data files to obtain audio stream compression encoded data, and decoding the audio stream compression encoded data to obtain audio content; and decapsulating the video data files to obtain video stream compression encoded data, and decoding the video stream compression encoded data to obtain video content.

Step 203, performing synchronous playing of audio and video on the streaming media content according to the audio content and the video content.

According to some embodiments, the method further includes:

obtaining, upon receipt of an audio language switching instruction in a process of audio-only playing, the audio data files corresponding to a language from the server, and playing audio content corresponding to the language according to the audio data files.

For example, content to be played is an American movie, and the movie is available in two languages: English original sound and Chinese dubbing. English original sound or Chinese dubbing can be chosen to listen to according to the user's choice in the process of audio-only playing.

Figure 3:
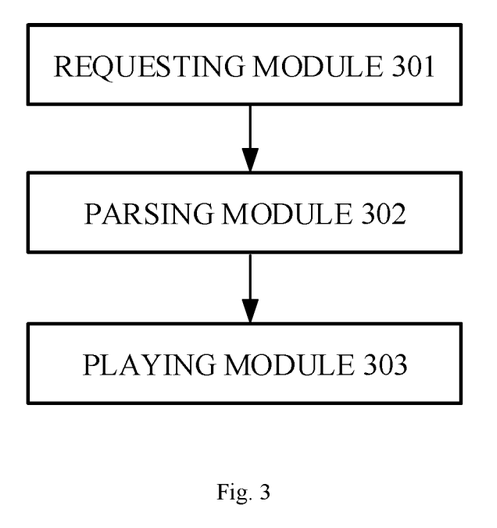
FIG. 3 is a block diagram of a device of switching audio and video according to some embodiments.

Based on the method of switching audio and video according to some embodiments, a device of switching audio and video is provided in some embodiments. Specifically, FIG. 3 illustrates a block diagram of the device of switching audio and video, the device of switching audio and video may be divided into one or more program modules, which are stored in a medium, and executed by one or more processors to complete the present application. The program module referred to in the present application refers to a series of computer program instruction segments capable of accomplishing specific functions. The following description will specifically describe the functions of each program module of some embodiments.

As shown in FIG. 3, the device of switching audio and video applied to clients includes the following components:

a requesting module 301 for sending, upon receipt of an audio-only playing instruction in a process of synchronously playing audio and video of streaming media content using DASH, a request of obtaining audio data files of the streaming media content, wherein video data files formed according to video content of the streaming media content and the audio data files formed according to audio content of the streaming media content are stored in the server;

a parsing module 302 for receiving the audio data files of the streaming media content from the server, and parsing out the audio content according to the audio data files;

a playing module 303 for performing audio-only playing for the streaming media content according to the audio content.

According to some embodiments, in an audio-only play mode, the requesting module 301 is further configured to:

send, upon receipt of an audio and video synchronous playing instruction in a process of audio-only playing, a request of obtaining the audio data files and the video data files of the streaming media content to the server.

According to some embodiments, in the audio-only play mode, the parsing module 302 is further configured to:

receive the audio data files and the video data files of the streaming media content from the server, and parsing out the audio content according to the audio data files, and parsing out the video content according to the video data files.

According to some embodiments, in the audio-only play mode, the playing module 303 is further configured to:

perform audio and video synchronously playing for the streaming media content according to the audio content and the video content.

According to some embodiments, in the audio-only play mode, the requesting module 301 is specifically configured to:

obtain a timestamp of audio content currently being played, and determining a segment index of the audio content currently being played according to the timestamp;

send a request of obtaining an audio data file and a video data file corresponding to the segment index to the server;

wherein the streaming media content is divided into multiple segments, and each segment corresponds to a segment index, and each segment index corresponds to an audio data file and a video data file.

According to some embodiments, the parsing module 302 is configured to:

decapsulate the audio data files to obtain audio stream compression encoded data, and decoding the audio stream compression encoded data to obtain the audio content; and, decapsulate the video data files to obtain video stream compression encoded data, and decoding the video stream compression encoded data to obtain the video content.

According to some embodiments, the device further includes:

a switching module, configured to obtain, upon receipt of an audio language switching instruction in a process of audio-only playing, audio data files associated with a corresponding language from the server, and playing the audio content associated with the corresponding language according to the audio data files.

Figure 4:
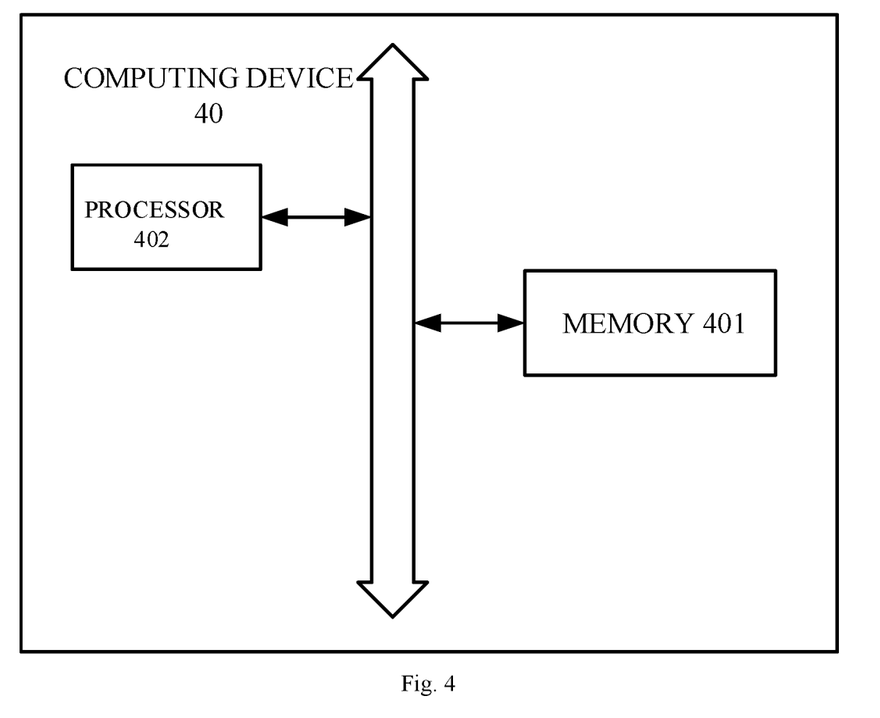
FIG. 4 is a diagram of hardware architecture of a computing device according to some embodiments.

According to some embodiments, a computing device is provided, wherein the computing device may include at least one of: a smartphone, tablet, laptop, desktop computer, rack server, blade server, tower server, or cabinet server (including stand-alone servers, or a cluster of multiple servers), and so on that can execute programs. As shown in FIG. 4, the computing device 40 in some embodiments includes, but is not limited to, a memory 401 and a processor 520 that can communicate with each other through a system bus. It is noted that FIG. 4 shows only a computing device 40 having components 401 and 402, but it is understood that it is not required to implement all of the shown components and that more or fewer parts can be implemented in lieu thereof.

In some embodiments, the memory 401(i.e., readable storage medium) includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 401 may be an internal storage module of the computing device 40 such as a hard disk or memory of the computing device 40. In other embodiments, the memory 510 may also be an external storage device of the computing device 40, such as a plugged hard disk provided on the computing device 40, a smart media card (SMC), secure digital (SD) card, a flash memory card, and the like. Of course, the memory 401 may also include both an internal storage module and an external storage device of the computing device 40. In some embodiments, the memory 401 is generally used to store an operating system and various types of application software installed in the computing device 40 such as program codes of the device of switching audio and video of the second embodiment and the like. In addition, the memory 401 may also be used to temporarily store various types of data that have been or will be outputted.

The processor 402, in some embodiments, may be a central processing unit (CPU), a controller, a microprocessor, or other data processing chip. The processor 402 is generally used to control the overall operation of the computing device 40.

Specifically, in some embodiments, the processor 402 is used to run programs of a method of switching audio and video stored in the processor 402, when the programs of the method of switching audio and video is executed, the following steps are implemented:

sending, upon receipt of an audio-only playing instruction in a process of synchronously playing audio and video of streaming media content using DASH, a request of obtaining audio data files of the streaming media content to a server, wherein video data files formed according to video content of the streaming media content and the audio data files formed according to audio content of the streaming media content are stored in the server;

receiving the audio data files of the streaming media content from the server, and parsing out the audio content according to the audio data files;

performing audio-only playing for the streaming media content according to the audio content.

The specific embodiment process of the above method steps can be referred to corresponding embodiments as described above, which are not repeatedly described herein.

According to some embodiments, a non-transitory computer-readable storage medium (volatile/non-volatile) is provided, wherein the non-transitory computer-readable storage medium may include at least one of: a flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, server, App store, etc., which stores computer-readable instructions that upon execution by a processor cause the processor to implement the steps of:

sending, upon receipt of an audio-only playing instruction in a process of synchronously playing audio and video of streaming media content using DASH, a request of obtaining audio data files of the streaming media content to a server, wherein video data files formed according to video content of the streaming media content and the audio data files formed according to audio content of the streaming media content are stored in the server;

receiving the audio data files of the streaming media content from the server, and parsing out the audio content according to the audio data files;

performing audio-only playing for the streaming media content according to the audio content.

The specific embodiment process of the above method steps can be referred to corresponding embodiments as described above, which are not repeatedly described herein.

The method of switching audio and video, a computing device, and a readable storage medium provided by the present application can automatically switch to audio-only play mode according to a user instruction or a play status in a process of playing streaming media content, so that only audio content is played while video content is not played, which reduces the users' traffic usage, still meets users' requirements of listening to audio content and improves user's experience.

It should be noted that, in this article, the terms "including", "having" or any other variants thereof are intended to cover non-exclusive inclusion, so that a process, method, article or device including a series of elements includes not only those elements, but also includes other elements not explicitly listed, or elements inherent to such a process, method, article, or device. Without more restrictions, an element limited by the sentence "including a . . . " does not exclude that there are other identical elements in the process, method, article, or device that includes the element.

The above-mentioned serial numbers of some embodiments of the present application are merely for description and do not represent the superiority or inferiority of some embodiments.

From the above description of the implementation method, it is clear to those skilled in the art that the above implementation method can be implemented by means of software plus the necessary general hardware platform, or of course by means of hardware, but in many cases, the former is usually a better implementation method.

The embodiments described above are just some embodiments of the present application and thus do not limit the scope of the present application. Any equivalent structure or equivalent process transformation made according to the contents of the description and the drawings of the present application, or any direct or indirect application thereof to other related arts shall be also included in the protection scope of the present application.

What is claimed is:

1. A method, comprising:
   performing synchronously playing audio and video of streaming media content using Dynamic Adaptive Streaming over HTTP (DASH) corresponding to audio and video synchronously play mode;
   sending, upon receipt of an audio-only playing instruction in a process of the synchronously playing audio and video of streaming media content using DASH, a request of obtaining audio data files of the streaming media content to a server, wherein the audio-only playing instruction is used to switch play mode from the audio and video synchronously play mode to an audio-only play mode, and wherein video data files formed according to video content of the streaming media content and the audio data files formed according to audio content of the streaming media content are stored in the server;
   receiving the audio data files of the streaming media content from the server, and parsing out the audio content according to the audio data files; and
   performing audio-only playing for the streaming media content corresponding to audio and audio-only play mode according to the audio content, wherein the audio-only playing for the streaming media content comprises: playing the audio the streaming media content without playing the video of the streaming media content.

2. The method according to claim 1, further comprising:
   sending, upon receipt of an audio and video synchronous playing instruction in a process of audio-only playing, a request of obtaining the audio data files and the video data files of the streaming media content to the server;
   receiving the audio data files and the video data files of the streaming media content from the server, parsing out the audio content according to the audio data files, and parsing out the video content according to the video data files; and
   performing synchronous playing of audio and video for the streaming media content according to the audio content and the video content.

3. The method according to claim 1, wherein parsing out the audio content comprises:
   decapsulating the audio data files to obtain audio stream compression encoded data, and decoding the audio stream compression encoded data to obtain the audio content.

4. The method according to claim 2, wherein sending a request of obtaining the audio data files and the video data files of the streaming media content to the server comprises:
   obtaining a timestamp of audio content currently being played, and determining a segment index of the audio content currently being played according to the timestamp; and
   sending a request of obtaining an audio data file and a video data file corresponding to the segment index to the server,
   wherein the streaming media content is divided into multiple segments, each segment corresponds to a segment index, and each segment index corresponds to an audio data file and a video data file.

5. The method according to claim 2, wherein parsing out the video content comprises:
   decapsulating the video data files to obtain video stream compression encoded data, and decoding the video stream compression encoded data to obtain the video content.

6. The method according to claim 1, further comprising:
   obtaining, upon receipt of an audio language switching instruction in a process of audio-only playing, audio data files associated with a corresponding language from the server, and playing the audio content associated with the corresponding language according to the audio data files.

7. The method according to claim 1, wherein the streaming media content is divided into multiple segments, and wherein the method further comprises obtaining the audio content from an audio buffer area and stopping obtaining the video content from a video buffer area, and
   wherein performing audio-only playing for the streaming media content comprises performing the audio-only playing for a current segment of the streaming media content, and
   wherein sending a request of obtaining audio data files of the streaming media content to a server comprises sending a request of obtaining an audio data file of a next segment of the streaming media content to the server.

8. A computing device, comprising:
   one or more processors; and
   a memory storing one or more programs configured to be executed by the one or more processors, the one or more programs comprising instructions for:
   performing synchronously playing audio and video of streaming media content using Dynamic Adaptive Streaming over HTTP (DASH) corresponding to audio and video synchronously play mode;
   sending, upon receipt of an audio-only playing instruction in a process of the synchronously playing audio and video of streaming media content using DASH, a request of obtaining audio data files of the streaming media content to a server, wherein the audio-only playing instruction is used to switch play mode from the audio and video synchronously play mode to an audio-only play mode, and wherein video data files formed according to video content of the streaming media content and the audio data files formed according to audio content of the streaming media content are stored in the server;

receiving the audio data files of the streaming media content from the server, and parsing out the audio content according to the audio data files; and performing audio-only playing for the streaming media content corresponding to audio and audio-only play mode according to the audio content, wherein the audio-only playing for the streaming media content comprises: playing the audio the streaming media content without playing the video of the streaming media content.

9. The computing device according to claim 8, wherein the one or more programs further comprises instructions for:

sending, upon receipt of an audio and video synchronous playing instruction in a process of audio-only playing, a request of obtaining the audio data files and the video data files of the streaming media content to the server;

receiving the audio data files and the video data files of the streaming media content from the server, and parsing out the audio content according to the audio data files, and parsing out the video content according to the video data files; and performing synchronous playing of audio and video for the streaming media content according to the audio content and the video content.

10. The computing device according to claim 9, wherein sending a request of obtaining the audio data files and the video data files of the streaming media content to the server comprises:

obtaining a timestamp of audio content currently being played, and determining a segment index of the audio content currently being played according to the timestamp; and sending a request of obtaining an audio data file and a video data file corresponding to the segment index to the server, wherein the streaming media content is divided into multiple segments, each segment corresponds to a segment index, and each segment index corresponds to an audio data file and a video data file.

11. The computing device according to claim 9, wherein parsing out the audio content comprises:

decapsulating the audio data files to obtain audio stream compression encoded data, and decoding the audio stream compression encoded data to obtain the audio content.

12. The computing device according to claim 9, wherein parsing out the video content comprises:

decapsulating the video data files to obtain video stream compression encoded data, and decoding the video stream compression encoded data to obtain the video content.

13. The computing device according to claim 8, wherein the one or more programs further comprises instructions for:

obtaining, upon receipt of an audio language switching instruction in a process of audio-only playing, audio data files associated with a corresponding language from the server, and playing the audio content associated with the corresponding language according to the audio data files.

14. The computing device according to claim 8, wherein the streaming media content is divided into multiple segments, and wherein the one or more programs further comprises instructions for obtaining the audio content from an audio buffer area and stopping obtaining the video content from a video buffer area, and wherein performing audio-only playing for the streaming media content comprises performing the audio-only playing for a current segment of the streaming media content, and wherein sending a request of obtaining audio data files of the streaming media content to a server comprises sending a request of obtaining an audio data file of a next segment of the streaming media content to the server.

15. A non-transitory computer-readable storage medium storing one or more programs comprising instructions that, when executed by one or more processors of a computing device, cause the computing device to perform operations comprising:

performing synchronously playing audio and video of streaming media content using Dynamic Adaptive Streaming over HTTP (DASH) corresponding to audio and video synchronously play mode;

sending, upon receipt of an audio-only playing instruction in a process of the synchronously playing audio and video of streaming media content using DASH a request of obtaining audio data files of the streaming media content to a server, wherein the audio-only playing instruction is used to switch play mode from the audio and video synchronously play mode to an audio-only play mode, and wherein video data files formed according to video content of the streaming media content and the audio data files formed according to audio content of the streaming media content are stored in the server;

receiving the audio data files of the streaming media content from the server, and parsing out the audio content according to the audio data files; and performing audio-only playing for the streaming media content corresponding to audio and audio-only play mode according to the audio content, wherein the audio-only playing for the streaming media content comprises: playing the audio the streaming media content without playing the video of the streaming media content.

16. The non-transitory computer-readable storage medium according to claim 15, wherein the one or more programs further comprises instructions that, when executed by one or more processors of a computing device, cause the computing device to perform operations comprising:

sending, upon receipt of an audio and video synchronous playing instruction in a process of audio-only playing, a request of obtaining the audio data files and the video data files of the streaming media content to the server;

receiving the audio data files and the video data files of the streaming media content from the server, and parsing out the audio content according to the audio data files, and parsing out the video content according to the video data files; and performing synchronous playing of audio and video for the streaming media content according to the audio content and the video content.

17. The non-transitory computer-readable storage medium according to claim 16, wherein sending a request of obtaining the audio data files and the video data files of the streaming media content to the server comprises:

obtaining a timestamp of audio content currently being played, and determining a segment index of the audio content currently being played according to the timestamp; and sending a request of obtaining an audio data file and a video data file corresponding to the segment index to the server, wherein the streaming media content is divided into multiple segments, and each segment corresponds to a segment index, and each segment index corresponds to an audio data file and a video data file.

18. The non-transitory computer-readable storage medium according to claim 16, wherein parsing out the audio content comprises:

decapsulating the audio data files to obtain audio stream compression encoded data, and decoding the audio stream compression encoded data to obtain the audio content.

19. The non-transitory computer-readable storage medium according to claim 16, wherein parsing out the video content comprises:

decapsulating the video data files to obtain video stream compression encoded data, and decoding the video stream compression encoded data to obtain the video content.

20. The non-transitory computer-readable storage medium according to claim 15, wherein the one or more programs further comprises instructions that, when executed by one or more processors of a computing device, cause the computing device to perform operations comprising:

obtaining, upon receipt of an audio language switching instruction in a process of audio-only playing, audio data files associated with a corresponding language from the server, and playing the audio content associated with the corresponding language according to the audio data files.

* * * * *